(12) United States Patent
Simpson

(10) Patent No.: US 6,508,346 B1
(45) Date of Patent: Jan. 21, 2003

(54) TORQUE CONVERTER ASSEMBLY

(75) Inventor: William Ralph Simpson, Saline, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/690,032

(22) Filed: Oct. 16, 2000

(51) Int. Cl.⁷ .............................................. F16H 45/02
(52) U.S. Cl. .................................... 192/3.3; 192/213.1
(58) Field of Search ........................... 192/3.3, 85 AA, 192/213.1, 3.29

(56) References Cited

U.S. PATENT DOCUMENTS

| | | | | |
|---|---|---|---|---|
| 3,040,589 A | * | 6/1962 | Chapman | 192/3.3 |
| 3,240,308 A | * | 3/1966 | Frost | 192/103 F |
| 4,131,184 A | * | 12/1978 | Rumyantsev et al. | 192/103 FA |
| 4,802,564 A | * | 2/1989 | Stodt | 188/71.5 |
| 5,054,590 A | * | 10/1991 | Paulsen | 192/3.29 |
| 5,695,032 A | * | 12/1997 | Murata et al. | 192/213.1 |
| 5,975,261 A | * | 11/1999 | Woerner et al. | 192/212 |
| 6,099,435 A | * | 8/2000 | Halene et al. | 192/3.29 |
| 6,244,401 B1 | * | 6/2001 | Maienschein et al. | 192/213.1 |

FOREIGN PATENT DOCUMENTS

JP          5-79560         *  3/1993

* cited by examiner

Primary Examiner—Rodney H. Bonck
(74) Attorney, Agent, or Firm—F. G. McKenzie

(57) ABSTRACT

A torque converter assembly 10 includes a clutch assembly 36 having a sealed chamber 39 into which oil is selectively communicated, effective to cause a piston 40 to selectively engage a plate assembly 30.

15 Claims, 1 Drawing Sheet

TORQUE CONVERTER ASSEMBLY

FIELD OF THE INVENTION

The present invention generally relates to a torque converter assembly and more particularly, to a torque converter assembly which includes a selectively activated clutch assembly which is desirably operable at a wide variety of engine speeds and gear ratios.

BACKGROUND OF THE INVENTION

Torque converter assemblies are generally used to receive rotational energy provided by an engine and to utilize this rotational energy to produce a "smooth" amount of rotational energy in appropriate form to operate a vehicle or other type of assembly. Particularly, a conventional vehicular torque converter assembly receives the ignition-produced energy from a crankshaft and causes the produced energy to be communicated to a turbine assembly, effective to produce the previously delineated and relatively constant energy to the vehicular transmission assembly by the use of a turbine shaft. Torque converters typically waste less energy than the other types of torque transferring systems when used within application having a relatively large difference between input and output speeds.

It is known to be advantageous to selectively allow the turbine shaft, which is typically coupled to the transmission assembly or "gearbox", to be selectively coupled or connected to the crankshaft of an engine by the use of a clutch assembly. It is desirable to "engage" the clutch assembly in order to cause the crankshaft and turbine shafts to be connected, effective to increase the efficiency of the energy which is transferred between the engine and the transmission assembly, and being further effective to reduce overall vehicular fuel consumption. Particularly, the clutch assembly is applied to reduce slippage between the input and output members, thereby increasing fuel economy by passing virtually all of the energy liberated by the engine to the transmission without wasting energy by shearing oil.

Conventionally, the clutch assembly is "engaged" by the use of a piston which is controlled by the use of the same pressurized oil which cools the clutch assembly and the various other components of the torque converter. While this "open piston" configuration does provide for desired and selective clutch engagement at relatively high engine speeds and during the use of relatively "high" gear ratios, its use at relatively "low" engine speeds and relatively "low" gear ratios is limited due to its relatively large "lag time" (e.g., the relatively large amount of time that is needed for the clutch assembly to be engaged, disengaged, or to change capacity).

It therefore may be desirable to provide a torque converter assembly which desirably provides relatively "smooth" amounts of energy to a transmission assembly and which further provides enhanced fuel and energy efficiencies due to the use of a clutch assembly which may be used over a wider variety of engine speeds and with a wider variety of gearing ratios.

SUMMARY OF THE INVENTION

It is a first object of the present invention to provide a torque converter assembly, including a clutch assembly having a relatively short lag time.

It is a second object of the present invention to provide a torque converter assembly, including a clutch assembly having a relatively short lag time and which may be desirably and operatively engaged at a wider variety of engine speeds and at a wider variety of gearing ratios than current clutches.

It is a third object of the present invention to provide a torque converter assembly, including a clutch assembly having a relatively short lag time and which is operatively and selectively engaged by a piston which is communicatively coupled to a control chamber into which a certain amount of material is selectively and movably disposed.

According to a first aspect of the present invention, a torque converter assembly is provided. The torque converter assembly comprises a first crankshaft engagement portion; a second turbine shaft engagement portion; an impeller having a turbine which is selectively connected to the turbine shaft engagement portion; and a clutch assembly having a piston which is disposed within a substantially sealed chamber and which is movable from a first position in which the crankshaft engagement portion is connected to the turbine shaft engagement portion by use of the impeller and the turbine to a second position in which the crankshaft engagement portion is additionally connected to the turbine shaft engagement portion by use of the clutch assembly.

According to a second aspect of the present invention, a clutch assembly is provided and includes several plates; a sealed chamber; oil which selectively disposed within the sealed chamber; and a piston which sealingly communicates with the sealed chamber and which is movable from a first position to a second plate contacting position upon the placement of oil within the sealed chamber.

According to a third aspect of the present invention, a method for connecting a crankshaft to a turbine shaft is provided. The method includes the steps of providing a case; coupling the crankshaft to the case; providing a clutch assembly having several movable plates; coupling the clutch assembly to the turbine shaft; providing a substantially sealed chamber; providing a piston; causing the piston to sealingly communicate with the chamber; placing oil in the substantially sealed chamber, effective to cause the piston to engage the movable plates, thereby connecting the turbine shaft to the crankshaft.

DETAILED DESCRIPTION OF THE PREFERRED EMBODIMENT OF THE INVENTION

Figure 1:
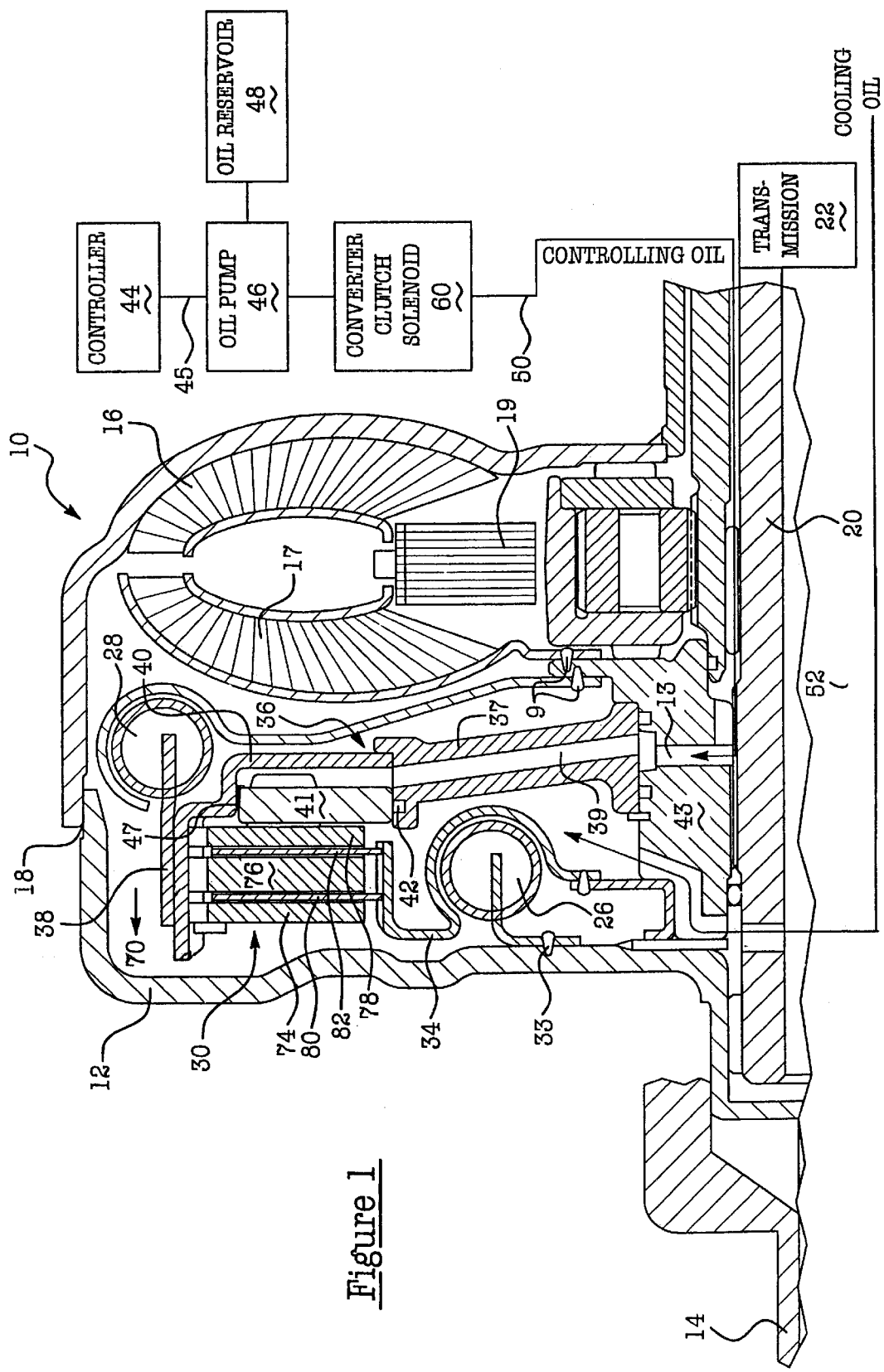
FIG. 1 is a schematic diagram of a torque converter assembly which is made in accordance with the teachings of the preferred embodiment of the invention.

Referring now to FIG. 1, there is shown a torque converter assembly 10 which is made in accordance with the teachings of the preferred embodiment of the invention. Particularly, torque converter assembly 10 includes a cover member or "crankshaft engagement member" 12 which is connected to a conventional crankshaft member 14 in a conventional manner (e.g., by use of a flex plate assembly (not shown)). While the present discussion relates to internal combustion engines, which have periodic variations in torque feed to the torque converter, it should be appreciated that the present torque converter assembly could also be used with systems that have an input torque that does not vary periodically, such as turbo-compound piston engines and gas turbines.

Torque converter assembly 10 further includes an impeller member 16, having a substantially low profile, torus turbine member 17 and which is connected (e.g., by the use of weld type connection 18) to the cover member 12. Impeller member 16 and turbine member 17 are collectively referred to as the "hydrodynamic drive assembly". Member 16 cooperates with the cover member 12 to operatively house and/or contain the various members and/or components necessary to selectively and desirably transfer rotational type energy from the crankshaft 14 to the turbine shaft 20 which is operatively coupled to and/or integrally formed with a "gearbox" or transmission assembly 22.

Further, as shown in FIG. 1, torque converter assembly 10 further includes an oil reactor member 19 which is operatively disposed within the turbine 17, a pair of spring isolator assemblies 26, 28 and a plate assembly 30. Particularly, isolator assembly 26 is connected to the cover member 12 by use of a welded connection 33 and isolator assembly 26 is connected to the plate assembly 30 by the use of the clutch hub member 34 (i.e., member 34 is connected to assembly 30 by splines). Moreover, isolator assembly 28 is connected to the plate assembly 30 by the use of a member 38 and isolator assembly 28 is connected to the turbine member 17 and to the turbine hub member 43 by use of welded connections 9.

Torque converter assembly 10 also includes a cylinder assembly 36 comprising a first member 37 having a radially coextensive chamber 39, a second member 40 which is welded to the member 37 and to the member 38, and a piston 41 having a seal 42 which is received within the member 37, effective to allow the piston 41 to be movably attached to the member 37. Cylinder assembly 36 also includes a seal 47 which is attached to the piston 41. Particularly, member 40 cooperates with piston 41, seal 42 and seal 47 to sealingly extend the chamber 39 behind the piston 41 and to allow the piston 41 to be "sealingly disposed" and communicatively coupled within the chamber 39. As shown, the turbine hub or "turbine engagement" member 43 is also connected to the turbine member 17 by use of the welded connection 9.

The torque converter assembly 10 further includes a controller 44 which is operable under stored program control, a oil pump 46 which is controllably coupled to the controller 44 by a bus 45, and an oil reservoir 48 which is coupled to the oil pump 46. The oil pump 46 is communicatively coupled to the sealed chamber 39 and to the cavity 13 by the use of conduit 50 and converter clutch control solenoid 60. The plate assembly 30 and the piston assembly 36 cooperatively comprise a clutch assembly. The controller 44, in one non-limiting embodiment, selectively activates the clutch assembly by sourcing oil, from the pump 46, through the torque converter clutch control solenoid 60 and conduit 50, into the extended closed chamber. The controller 44 continuously determines the desired clutch state and controls the pressure to the clutch accordingly. Particularly, controller 44 actively controls the oil pressure and converter clutch control solenoid 60 in order to manage the converter clutch assembly (e.g., plate assembly 30 and cylinder assembly 36).

In operation, the clutch assembly is activated when oil is communicated to the chamber formed by piston 41 and members 37, 40, via conduits 50, 39, effective to cause the piston 40 to move in the direction of arrow 70 against the plate assembly 30. Particularly, the plate assembly 30 includes reaction plate members 74, 76, 78 and friction plates 80, 82 which are compressed by the selectively moved piston 41, effective to directly transfer rotational energy from the crankshaft 14 to the turbine shaft 20 without the use of the turbine 17 and impeller 16 (e.g., the hydrodynamic drive assembly). Such energy transfer is accomplished through the cover 12, the isolator 26, the member 34, the plates 74–82, the member 40, the member 38, the isolator assembly 28, and the turbine hub member 43. Hence, when the clutch assembly is in this "activated" position or state, the crankshaft engagement portion or member 12 in connected to the turbine shaft engagement member or hub 43 through the clutch assembly.

When the clutch is deactivated, the rotational energy is transferred from the crankshaft 14 to the turbine shaft 20 through the cover member 12, the impeller 16, the turbine 17, the oil reactor, and the turbine hub member 43. Hence, when the clutch assembly is in this "deactivated" position or state, the crankshaft engagement portion or member 12 is connected to the turbine shaft engagement member or hub 43 only through the hydrodynamic drive assembly.

In the preferred embodiment, controller 44 controls the state of the clutch assembly based upon current vehicle and driver inputs. The clutch state can be "disengaged" (with the hydrodynamic drive carrying all energy transfer), "locked" (with the clutch engaged and carrying all energy transfer), and "slipping" (with the clutch slipping and both the hydrodynamic drive and clutch transferring energy). Slipping occurs when the clutch is in transition from one state to another and/or when a steady state slip is desired for suppression of vibration.

Importantly, the relatively small volume of the extended closed chamber 39 and the use of controlling oil, separate and apart from the cooling oil which is selectively communicated into the assembly 10 through conduit 52 allows the clutch assembly to have a relatively short lag time, thereby allowing the clutch assembly to be selectively used at a wide variety of engine speeds and gear ratios. Further, as shown in one non-limiting embodiment, the spring isolators 26, 28 are connected in a series arrangement, thereby allowing for relatively long travel and allowing the clutch assembly to remain engaged at a relatively low engine speed without objectionable vibration. Further, outer spring isolator 28 has multiple stages allowing it to progressively increase its spring rate as the amount of travel increases. The clutch capacity may also be rapidly changed to suit a variety of conditions, and the plate assembly 30 has a relatively large mass and constitutes a relatively large heat sink for converting slip energy into heat while substantially preventing damage to the oil and friction material which is used to construct the plates 80, 82. The clutch assembly has adequate thermal capacity to perform substantially seamless engagement during "driveway" maneuvers without overheating the components or the oil and allows for controlled clutch engagement when the air conditioner is activated, to "lug" the vehicle, and to reduce the probability of creating vibratory resonance. Isolators 26, 28 may be removed in another non-limiting embodiment. The hydrodynamic drive, the present invention has excellent isolative characteristics and does not require a damper.

It is to be understood that the invention is not limited to the exact construction and method which has been previously delineated above, but that various changes and modifications may be made without departing from the spirit and the scope of the invention as is delineated in the following claims.

What is claimed is:

1. A torque converter assembly comprising a first crankshaft engagement portion; a second turbine shaft engagement portion; an impeller having a turbine which is selectively connected to the turbine shaft engagement portion; a clutch assembly having a piston which is disposed within a substantially sealed chamber and which is movable from a first position in which the crankshaft engagement portion is connected to the turbine shaft engagement portion by use of said impeller and by use of said turbine to a second position in which said crankshaft engagement portion is additionally connected to said turbine shaft engagement portion by use of said clutch assembly; a first spring isolator which is operatively disposed between said crankshaft engagement member and said piston; a second spring isolator which is operatively disposed between said turbine and said piston, wherein said first spring isolator is coupled to said crankshaft engagement portion and to said clutch assembly, and wherein said second spring isolator is coupled to said clutch assembly, said turbine, and said turbine shaft engagement portion, and wherein said first and said second spring isolators are connected in an offset series arrangement.

2. The torque converter assembly of claim 1 wherein said assembly further comprises a chamber; a reservoir of material; a first conduit which is coupled to said reservoir of material and to said sealed chamber; and a second conduit which is coupled to said reservoir of material and to said chamber.

3. The torque converter assembly of claim 2 wherein said material comprises oil.

4. The torque converter assembly of claim 3 further comprising a controller which is operable under stored program control and which is coupled to said reservoir of material.

5. The torque converter assembly of claim 1 wherein said clutch assembly includes a plurality of reaction plates and a secured plurality of friction plates.

6. The torque converter assembly of claim 1 further comprising a pair of isolators connected in a series arrangement and coupled to the clutch assembly.

7. A clutch assembly comprising several plates; a sealed chamber; oil which is selectively disposed within the sealed chamber; a piston which sealingly communicates with the sealed chamber and which is movable from a first position to a second plate contacting position upon the placement of oil within the sealed chamber; a first spring isolator which is operatively disposed between a crankshaft engagement member and said piston; a second spring isolator which is operatively disposed between a turbine and said piston, wherein said first spring isolator is coupled to said crankshaft engagement portion and to said clutch assembly, and wherein said second spring isolator is coupled to said clutch assembly, said turbine, and a turbine shaft engagement portion, and wherein said first and said second spring isolators are connected in an offset series arrangement.

8. The clutch assembly of claim 7 wherein said plates include a first plurality of reaction plates and a second plurality of friction plates.

9. The clutch assembly of claim 8 further comprising a seal which contacts said piston and which cooperates with said piston to seal said chamber.

10. The clutch assembly of claim 8 further comprising a conduit which is sealingly coupled to said chamber.

11. A method for connecting a crankshaft to a turbine shaft having a turbine comprising the steps of providing a case; coupling the crankshaft to the case; providing a clutch assembly having several movable plates; coupling the clutch assembly to the turbine shaft; providing a turbine engagement member and coupling said turbine engagement member to said turbine; providing a substantially sealed chamber; providing a piston; causing the piston to sealingly communicate with the chamber;

providing a first spring isolator and operatively disposing said first spring isolator between said case and said piston; providing a second spring isolator and operatively disposing said second spring isolator between said turbine and said piston; coupling said first spring isolator to said case and to said clutch assembly; coupling said second spring isolator to said clutch assembly, to said turbine, and to said turbine engagement member, wherein said first and said second spring isolators are connected in an offset series arrangement; and placing oil in the substantially sealed chamber, effective to cause the piston to engage the movable plates, thereby connecting the turbine shaft to the crankshaft.

12. The method of claim 11 wherein said clutch assembly includes a plurality of reaction plates and a second plurality of friction plates.

13. The method of claim 11 further comprising the step of placing a second portion of said oil within said case.

14. The method of claim 11 further comprising the steps of:

providing a hydrodynamic drive assembly;

coupling said hydrodynamic drive assembly to said case and to said turbine shaft, effective to transfer energy between said crankshaft and said turbine shaft; and disengaging said clutch assembly, thereby causing said hydrodynamic drive assembly to carry all energy transfer between said crankshaft and said turbine shaft.

15. The method of claim 14 wherein said hydrodynamic drive assembly comprises an impeller and a turbine.

\* \* \* \* \*